United States Patent Office 3,487,636
Patented Jan. 6, 1970

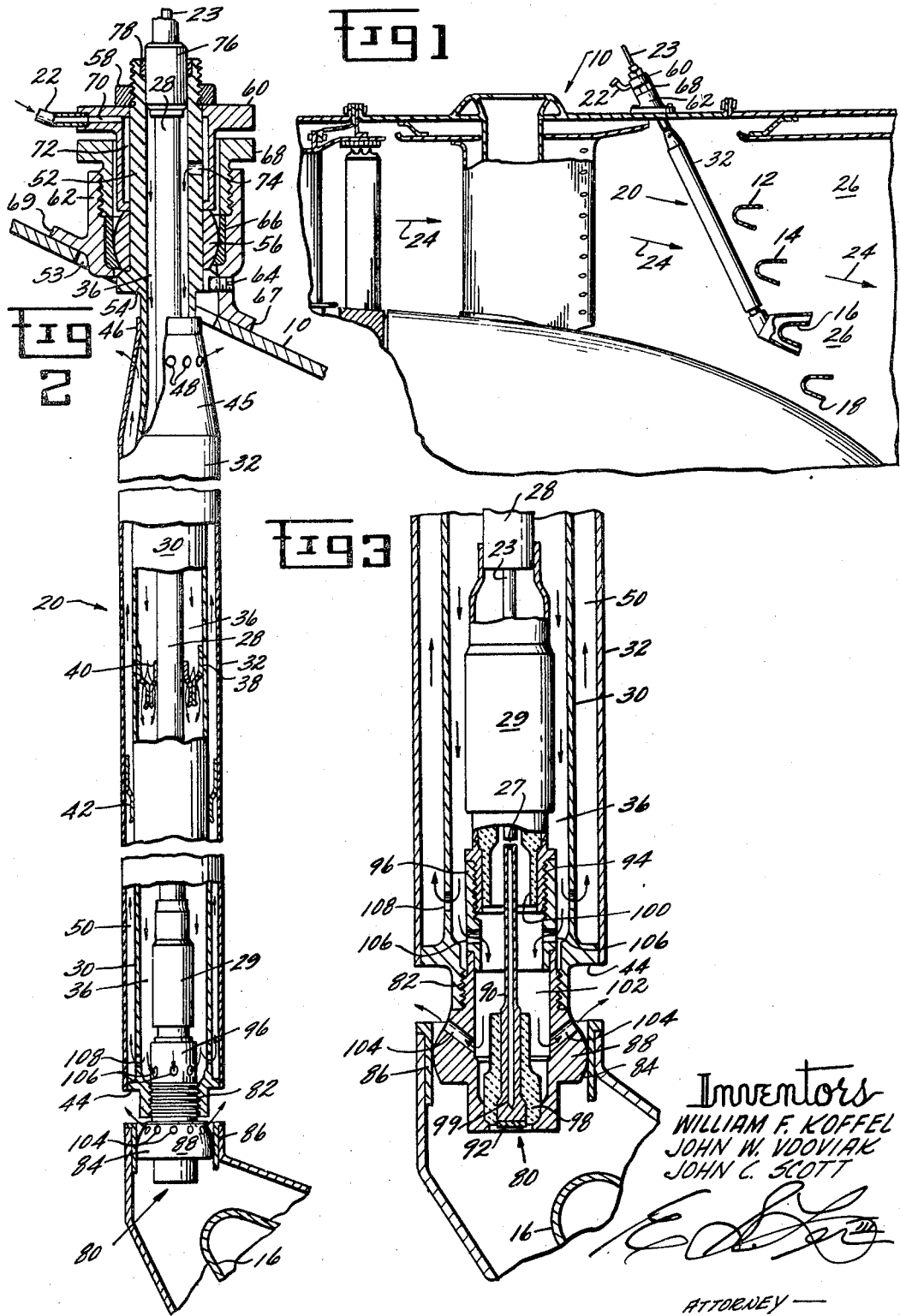

3,487,636
AUGMENTOR SPARK IGNITER
John W. Vdoviak, John C. Scott, and William K. Koffel, Cincinnati, Ohio, assignors to General Electric Company, a corporation of New York
Filed Jan. 2, 1968, Ser. No. 695,022
Int. Cl. F02c 7/26, 7/12; F02g 1/00
U.S. Cl. 60—39.82                                    7 Claims

ABSTRACT OF THE DISCLOSURE

An air-cooled spark igniter is provided for the afterburner of a gas turbine engine. A counterflowing, coolant arrangement directs air through the interior of the pylon discharging a portion thereof through the spark igniter plug. While the remainder of the cooling air flows outwardly for discharge from the pylon adjacent the outer wall of the hot gas duct.

---

The invention described and claimed in the United States patent application herein resulted from work done under United States Government contract FA-SS-66-6. The United States Government has an irrevocable, non-exclusive license under said application to practice and have practiced the invention claimed herein, including the unlimited right to sublicense others to practice and have practiced the claimed invention for any purpose whatsoever.

Background of the invention

The afterburner of a gas turbine engine is used to augment or boost the normal thrust rating of the engine. Afterburning thrust augmentation is the most common method of thrust augmentation and is particularly suitable for take-off and high Mach-number flight augmentation. By using afterburning, the maximum thrust of a larger gas turbine engine is obtained without sacrificing the economy of the small basic gas turbine. The afterburner functions by burning the excess air remaining from the operation of the main engine to increase the velocity of the gas at the exit of the nozzle and thereby achieve added thrust.

The afterburner duct may be considered a converted engine tailpipe since it functions as the main engine tailpipe during non-afterburning (cold) operation and is also the main working element of the afterburner. The entire afterburner is cantilevered from the engine as by being bolted to the exhaust end. The essential working elements of the afterburner are an afterburner duct, a flame holder and a variable area exhaust nozzle.

The afterburner duct is the main working element of the afterburner. It must be so designed that the normal pressure relationship between the air entering the main engine turbine and the air leaving the turbine is not upset. Since the afterburner duct acts as a burner, the inlet air velocity must be sufficiently low to support stable combustion and to avoid excessive pressure losses. For this reason a diffuser is provided between the turbine outlet and the afterburner duct inlet. Thus, the burner section of the duct can reduce gas velocity so that it does not exceed the flame propagation rate. Otherwise, the flame could not get a foothold because the on-rushing turbine exhaust would simply push the burning mixture out of the exhaust nozzle. In addition to the diffuser, some mechanical mixing of the fuel and air is necessary, since mixing by diffusion is too slow a process to be an aid in forming a combustible mixture.

The flame holders provide local turbulence and reduce the velocity within the duct thereby assisting combustion stability. The flame holders are located downstream from the fuel injection nozzle of the afterburner thereby allowing time for proper mixing of the fuel and air before reaching the burner area which is downstream from the flame holders. The flame holders may be U-shaped and may be mounted as by means of support rods that project through the wall of the duct.

The variable exhaust nozzle is positioned at the outlet of the afterburner duct in order to prevent excessive back pressure on the turbine. The mass of gas is essentially unchanged in an afterburner, but its volume is increased by the addition of heat, so it is necessary to thereby increase the jet nozzle area during afterburning. A failure to increase the jet nozzle area would result in an excessive temperature increase at the turbine inlet in order to obtain the power required to drive the compressor at the desired speed.

The afterburner is thus named because the air going through the engine is subjected to additional burning after the basic cycle is completed. The maximum thrust increase from an afterburner is limited by the oxygen remaining in the gas emerging from the turbine. If all the oxygen is consumed in the afterburner, an increase in thrust of about 50% can be obtained. However, the fuel consumption will be nearly four times as high since considerable additional fuel is sprayed into the exhaust stream aft of the turbine during afterburning.

In order to ignite the combustible mixture within the afterburner duct, a spark igniter or spark plug is used Since the spark igniter is located within the afterburner duct, it is subjected to both high turbine outlet temperatures during non-afterburning operation of the engine and afterburner combustion temperatures during afterburner operation of the engine. The spark igniter is thus subject to an environment of high temperature operation which serves to limit its useful life.

Brief description of the invention

Briefly described, this invention relates to an air cooled spark igniter for the afterburner of a jet engine. Air cooling is provided in order to extend the life of the spark igniter normally limited by the high temperatures of the turbine outlet, the afterburner duct, and the high energy sparking requirement of the spark igniter.

The spark igniter of this invention is comprised of a main body or pylon having one end thereof secured to the wall of the afterburner duct. An igniter plug including a plug body, a center electrode, and a sparking tip is secured to the second end of the pylon and is supported within the afterburner duct by means of a support member or receptacle secured to a flame holder. The pylon itself is defined by first, second and third shell members coaxially disposed. The first or inner shell member defines a housing for an electrical lead extending from the afterburner duct wall to the center electrode of the igniter plug. The annular space between the outer wall of the inner or first shell and the inner wall of the intermediate or second shell defines an inner passageway for cooling air flowing from a source provided at the duct wall to the interior of the igniter plug body where the cooling air is passed in heat exchange relationship to the center electrode. Thereafter the cooling air is passed into the afterburner duct where it is consumed in the combustion process. In passing about the inner or first shell member, the cooling air also prevents excessive temperature rise of the electrical lead disposed within the first shell member. A second or outer cooling passage is defined in the annular space between the outer wall of the second or intermediate shell member and the inner wall of the third or outer shell member. The flow of cooling air in this outer annular passageway is in counterflow relationship to the flow of air in the first annular passageway. Ports are provided adjacent the igniter plug to provide communication between the inner and outer annular passageways. In addition, exhaust ports are provided in the third or outer shell member adjacent the afterburner duct wall. The cooling air in the outer annular passageway thus prevents over temperature of the outer shell member directly in contact with the high temperature gases of the afterburner duct. Cooling air leaving the outer annular passageway via the exhaust ports defined in the third shell member becomes intermixed with the gases of the afterburner duct and is consumed in the combustion process.

This invention, therefore, provides for a flow of cooling air within a spark igniter from an external source to the center electrode of the igniter plug. At the igniter plug a first portion of cooling air is introduced into the interior of the plug body in order to provide cooling of the center electrode and the surrounding insulator plug. A second portion of cooling air is passed in counterflow relationship to the inlet cooling air from the igniter plug back to the duct wall where it is exhausted into the duct.

Description of the invention

A more complete description of the spark igniter of this invention will now be made with reference to the accompanying figures in which:

FIG. 1 is a partial cross-sectional view of the afterburner duct of a gas turbine engine and showing the spark igniter of this invention extending from the duct wall and supported by a flame holder.

FIG. 2 is an elevational view partly in section of the spark igniter of this invention as secured to the afterburner duct and supported by a flame holder.

FIG. 3 is a greatly enlarged elevational view partly in section of one end of the spark igniter of this invention showing in detail the igniter plug.

Referring now to FIG. 1, there is shown a partial cross-sectional view of the afterburner duct of a gas turbine engine and in particular the engine tailpipe 10, the engine flame holders 12, 14, 16 and 18 and the spark igniter 20 of this invention extending from the duct wall defined by the tailpipe 10 and supported by flame holder 16. A source of cooling air for the spark igniter 20 is provided at 22 and a source of electrical power for the sparking tip (not shown) is provided at 23. Arrows 24 show the direction of the exhaust gases from the turbine. Fuel injection nozzles (not shown) spray fuel into the exhaust stream. After mixing of the fuel and unburned air from the turbine, burning takes place in the burner area 26, downstream of the flame holders. As previously noted, the flame holders 12, 14, 16, and 18 provide local turbulence and reduce velocity thereby assisting combustion stability. The flame holders are positioned in place by tie rods or other supporting members that project through the wall of the duct defined by the tailpipe 10. Ignition of the combustible mixture at the burning area 26, is accomplished by means of the sparking tip of the spark igniter 20.

Attention is now directed to FIG. 2 wherein there is shown an elevational view, partly in section, of the spark igniter 20 of this invention. The main body of the spark igniter is termed a pylon and is comprised of three shell members 28, 30, 32 coaxially positioned. The first or inner shell member 28 is generally tubular in configuration and defines a housing for an electrical lead 23 disposed therein. Electrical lead 23 extends from a first end of shell member 28 (where it is adapted to be connected to a source of electrical power as shown in FIG. 1) to a second end of shell member 28 where it is adapted to provide an electrical connection with the electrode of the igniter plug as will be described more fully hereafter.

Coaxially disposed about the first shell member 28 is a second or intermediate shell member 30. The annular space between the exterior wall of the inner shell member 28 and the interior wall of the intermediate shell member 30 defines an inner cooling air passageway 36 as will be described more fully hereafter. A sliding support for the inner shell member 28 is provided by means of a pair of ring members 38, 40. As shown in FIG. 2, rings 38, 40 have a generally Z-shaped cross section. Ring 40 is adapted to be secured to the exterior surface of shell member 28 as by means of welding or other connecting means well known to those skilled in the art. Similarly, ring 38 is adapted to be secured to the inner wall of shell member 30 in a manner known to those skilled in the art. The abutting rings 38, 40 thus provide a sliding support for the shell member 28 as suspended within the shell member 30. A number of passages are defined in ring members 38, 40 to provide for the flow of cooling air within inner passageway 36 as is shown by the arrows of FIG. 2. The third or outer shell member 32 is coaxially disposed about shell members 28, 30 and is supported by shell member 30 by means of ring 42 and flange 44. Ring 42 is generally Z-shaped in cross section and has one leg thereof secured to the inner wall of shell 32. The opposite leg of ring 42 freely abuts the exterior surface of shell 30 such that a sliding joint may thus be established between the members. Passages are defined in ring 42 to provide for the flow of cooling air. The first end of shell member 32 is inwardly tapered as at 45 and abuts the exterior surface of the intermediate shell member 30 at flange 46, forming a sliding connection therebetween to accommodate differential expansion of the shells. A plurality of exhaust ports 48 are defined within the shell member 32 for a purpose to be described more fully hereafter. The second end of the shell member 32 is secured to flange 44 of shell member 30 as by means of a weld or other attaching means well known to those skilled in the art. The annular space between the exterior surface of the shell member 30 and the interior surface of the shell member 32 defines an outer cooling air passageway 50 for a purpose to be described more fully hereafter.

The outer shell member 32 functions as a heat shield. This element is not necessarily circular and may be fabricated of any well known heat resistant material. The intermediate shell member 30 provides the structural rigidity for the entire igniter assembly including the inner shell 28, the outer shell 30 and the igniter plug assembly. The inner shell member 28 defines a housing for the electrical lead 23. When coaxially disposed as shown in FIG. 2, the shell members define respectively an inner cooling air passageway 36 and an outer cooling air passageway 50.

Attention is now directed to the upper portion of FIG. 2 wherein there is shown the connection between the spark igniter 20 and the afterburner duct wall defined by tailpipe 10. Shell member 30 includes an extension 52 thereon extending through an aperture 53 in the duct wall. A flange 54 is provided on extension 52. Disposed adjacent flange 54 is a spherical bearing seat 56. As is shown in FIG. 2, bearing seat 56 is clamped to flange 54 by means of a nut 58 and a spacer element 60. Nut 58 is threadedly received on the end of extension 52. Pinned to flange 54 by means of pin 64 is a bracket 62. Flanges 67, 69 are provided on bracket 62 in order to provide a connection between the bracket and the duct wall as by means of fasteners (not shown). Disposed within the bracket 62 is a seat element 66 having a seating surface complementary to the external surface of the spherical bearing seat 56. Seat element 66 is retained in place by means of gland 68 threadedly received within bracket 62. The shell member 30 is thus supported by bracket 62 in a manner to allow for relative motion between the tailpipe 10 and the flame holder 16. The provision of the separate spherical bearing seat 56 and the seat element 66 in conjunction with the spacer element 60, the gland 68 and nut 58 permits greater ease of assembly of the ball joint as compared to other ball joints of the prior art. This invention, however, should not be considered as limited to a particular ball joint construction of FIG. 2 as other tube-to-plate joints may be utilized within the scope of this invention.

Defined within spacer element 60 is a passageway 70 and a recess 72 for the purpose of supplying cooling air from an external source (not shown) to the annular passageway 36 via the supply conduit 22, passageway 70, recess 72 and inlet ports 74 defined in extension 52.

The end of the inner shell member 28 is supported within the extension 52 of the shell member 30 by means of a bushing 76. Sealing between bushing 76 and the inner wall of extension 52 may be provided by means of seal 78.

An igniter plug 80 is connected to the opposite end of the pylon at threads 82. Threads 82 are defined on an inner surface of the intermediate shell member 30. On the exterior surface of the igniter plug, there is defined a spherical bearing surface 84 adapted to be received within and supported by the flame holder receptacle 86. The igniter plug 80 is thus slidably supported by the flame holder receptacle 86 to allow for any relative motion between the flame holder 16 and the tailpipe 10.

Attention is now directed to FIG. 3 wherein there is shown a greatly enlarged cross-sectional view of the igniter plug 80 and the shell members. The igniter plug 80 is comprised of a body member 88, a center electrode 90, and a sparking tip 92. Body member 88 is threaded to shell member 30 at threaded surface 82 defined within an extension of shell member 30. The inner shell member 28 terminates in a receptacle 29 which is threadedly connected to a welded extension 96 of body 88 by means of threads 94. The receptacle 29 is provided with a ceramic insulating liner 100. The electrical lead 23 is sealed as it projects into the receptacle and terminates short of an enlarged bore at the lower end of the liner 100. The electrical connection between lead 23 and electrode 90 is preferably accomplished through an air gap 27.

The lower end of the electrode 90 is supported by a ceramic plug 98 in the body 88. In the preferred embodiment of FIGURE 3, the center electrode 90 is provided with a copper core 99 in order to improve heat conduction from the sparking tip 92. The receptacle 29 and plug 98 define, within extension 96 and body 88, a cooling chamber 102. Exhaust ports 104 are defined within body 88 to provide communication between cooling chamber 102 and the exterior of the igniter plug 80. Inlet ports 106 are defined in extension 96 in order to provide communication between inner cooling air passageway 36 and cooling chamber 102. In order to provide communication between inner cooling air passageway 36 and outer cooling air passageway 50, connection ports 108 are defined within the shell member 30 adjacent the igniter plug 80.

Description of igniter cooling

A brief description of air cooling of the igniter assembly of this invention will now be made with reference to FIGS. 2 and 3. Cooling air from a suitable source such as compressor bleed enters inner cooling air passageway 36 via passageway 70, recess 72 and inlet port 74. As shown by the arrow direction of FIG. 2, flow of cooling air from the external source in passageway 36 is toward the igniter plug 80. While in passageway 36, cooling air surrounds the inner shell member 28 thus minimizing a temperature rise of the electrical lead 23, as well as the shell member 30. As shown in FIG. 3, the air flow splits at the igniter plug partially flowing into the interior of body 88 through inlet ports 106 and partially flowing through connector ports 108 into the outer passageway 50. Cooling air passing into the cooling chamber 102 defined by the external surface of the center electrode 90 and the internal surface of the body 88 is thus passed in heat exchange relationship to the center electrode 90 before being exhausted through exhaust ports 104 to the exterior of the igniter plug 80. While the cooling air within the cooling chamber 102 does not come into contact with the sparking tip 92, the copper core 99 of the center electrode 90 improves heat conduction from the sparking tip to the central portion of the electrode. Cooling air flowing through connecting ports 108 into passageway 50 flows toward the tailpipe 10 in a counterflow relationship with respect to the flow within the passageway 36 and is thereafter exhausted through exhaust ports 48 defined within the outer shell 32. Cooling air within passageway 50 prevents over temperature of the outer shell 32 and the intermediatae shell 30 and also prevents excessive temperature rise of the incoming air in the passageway 36.

The afterburner ignition system is activated by the ignition contacts of the afterburner ignition switch. Components in the afterburner ignition unit (not shown) convert the supply voltage from the aircraft power supply into pulsating D.C. These components are grouped in separate stages to filter, amplify, rectify, and store an electrical charge, which is then discharged from the sparking tip of the igniter plug. A sealed air gap in the ignition unit triggers the periodic discharge of a tank capacitor three to six times a second. Each time the capacitor discharges, a large surge of energy is transmitted through the spark electrode lead to the afterburner sparking tip.

The preferred embodiment of the invention described with reference to FIGS. 1–3 permits access to several of the components of the igniter for purposes of replacement. For instance, in the sequence of assembly of the igniter plug 80 the extension 96 is first secured to the inner shell member extension 29 by means of threads 94. Thereafter the body 88 of the igniter plug is screw threadedly attached to the shell member 30 by means of threads 82. Separate replacement of the igniter plug 80, the inner shell member 28, and the electrical lead 23 is provided for. The spark gap 27 connection between the electrode 90 and lead 23 prevents these two elements from welding together and particularly facilitates replacement of the igniter plug 80.

Throughout the description of the preferred embodiment of this invention, reference has been made to cooling air as the cooling fluid. Air as a cooling fluid is particularly desirable in an aircraft because it is readily available from the atmosphere and may be readily consumed in the combustion process of the afterburner duct of the gas turbine engine. Within the scope of this invention, therefore, should be considered other cooling fluids including liquids and gases.

This invention greatly extends igniter life thus rendering the igniter suitable for use in gas turbine engines having long life requirements. The high turbine outlet temperatures and high afterburner combustion temperatures of newer engines thus may be tolerated by the igniter of this invention. In addition, the igniter of this invention is capable of continuous high energy sparking without the shortened life characteristic of prior art igniters.

The air cooling passageways of this invention provide for the exhausting of cooling air into the afterburner duct where it is consumed in the combustion process. There is thus no necessity to recirculate the cooling air after being passed in heat exchange relationship to the heated components of the igniter.

For ease of description, the principles of the invention have been set forth in connection with but a single illustrated embodiment showing the agumentor spark igniter. It is not our intention that the illustrated embodiment nor the terminology employed in describing it be limiting inasmuch as variations in these may be made without departing from the spirit of the invention. Rather we desire to be restricted only by the scope of the appended claims.

Having thus described the invention, what is claimed as novel and desired to be secured by Letters Patent of the United States is:

1. In a thrust-augmented gas turbine engine including an afterburner duct, a flame holder disposed therein and a spark igniter assembly connected at one end to said flame holder, said spark igniter assembly comprising, a pylon attached at one end to said duct and extending to a point adjacent said flame holder, a spark igniter plug mounted on said pylon at its flame-holder end, means extending from the exterior of said duct and through the interior of said pylon to said spark igniter plug for providing an electrical connection thereto, coolant fluid passageway means extending through said pylon from the duct end of said pylon to the spark igniter and discharging into said duct, said passageway means comprising, a first passageway extending from the duct end of the pylon to the flame holder end of the pylon, a second passageway connected to the first passageway and extending from the flame holder end of the pylon to the duct end of the pylon, and means for discharging coolant fluid from at least one of said passageways, through the spark igniter plug to the duct and means for discharging coolant fluid from the second passageway into the duct at the duct end of the pylon, whereby the spark igniter plug is cooled and the pylon is cooled by counterflowing fluid.

2. A spark igniter assembly as in claim 1 wherein the pylon comprises, an outer tubular member, a second tubular member disposed generally concentrically therein and spaced therefrom, said first passageway is defined, at least in part, by the inner surface of said second tubular member, said second passageway is defined by the spaced, opposed walls of the outer and second tubular members, and openings in the second tubular member at the flame holder end of the pylon connect the first and second passageways.

3. A spark igniter assembly as in claim 2 wherein, the spark igniter plug comprises a hollow body portion having an electrode extending therethrough to which current is supplied by the electrical connection means, and the passageway means include a connection from said first passageway to the interior of said hollow body portion and outlets therefrom to said duct, adjacent said flame holder, whereby a portion of said coolant fluid flows through said hollow body portion and is discharged into said duct.

4. A spark igniter assembly as in claim 2 wherein, a third tubular member is disposed within said second tubular member generally concentrically thereof, and said electrical connection means comprise an electrical lead extending from the exterior of said duct through said third tubular member for connection with said spark igniter plug.

5. A spark igniter assembly as in claim 4 wherein, the spark igniter plug further includes an electrode extending through said hollow body and terminating in closely spaced relation from said electrical lead, whereby the electrical connection to said plug is through an air gap, and further wherein, said plug is removably secured to said pylon.

6. A spark igniter assembly as in claim 5 wherein, the spark igniter plug is threadably secured to said second and third tubular members.

7. A spark igniter assembly as in claim 1 wherein, spherically pivoting means are provided for attaching said pylon to said duct, and said flame holder has a tubular member receiving said spark igniter plug and said spark igniter plug has a spherical surface engaging said tube, whereby there can be relative sliding and pivotal movement between said pylon and said flame holder.

References Cited

UNITED STATES PATENTS

| | | |
|---|---|---|
| 2,465,092 | 3/1949 | Harkness et al. |
| 2,493,743 | 1/1950 | Benson. |
| 3,025,425 | 3/1962 | Logan _____ 60—39.82 XR |
| 3,026,675 | 3/1962 | Vesper et al. _____ 60—39.74 |
| 3,056,257 | 10/1962 | Brunkhardt. |
| 3,366,373 | 1/1968 | Reed _____ 60—39.72 XR |

MARK NEWMAN, Primary Examiner

ALAN D. HERRMANN, Assistant Examiner

U.S. Cl. X.R.

60—39.66